United States Patent [19]

Cline

[11] Patent Number: 4,748,770

[45] Date of Patent: Jun. 7, 1988

[54] INDOOR WINDOW BOX PLANTER

[76] Inventor: Joel S. Cline, 3100 S. Federal #220, Denver, Colo. 80236

[21] Appl. No.: 1,139

[22] Filed: Jan. 7, 1987

[51] Int. Cl.⁴ .............................................. A01G 9/02
[52] U.S. Cl. ............................................ 47/68; 47/66
[58] Field of Search ................... 248/200.1; 47/68, 66; 220/18

[56] References Cited

U.S. PATENT DOCUMENTS

| 961,352 | 6/1910 | Walters | 242/200.1 |
|---|---|---|---|
| 1,639,551 | 8/1927 | Booth | 248/200.1 |
| 1,690,910 | 11/1928 | Shapiro | 47/68 |
| 2,223,074 | 11/1940 | Martin | 47/68 |
| 2,980,281 | 4/1961 | Stewart | 220/18 |
| 3,090,071 | 5/1963 | Costelli | 220/18 |
| 3,269,551 | 8/1966 | Hertzel | 156/219 |
| 3,593,470 | 7/1971 | Francis | 47/68 |
| 4,048,754 | 9/1977 | Laux | 47/68 |

Primary Examiner—Robert A. Hafer
Assistant Examiner—Bradley M. Lewis
Attorney, Agent, or Firm—Henderson & Sturm

[57] ABSTRACT

A window box planter device (10) in combination with a window assembly (100) including a window frame (110) and a window sill (100) wherein the device (10) comprises a receptacle unit (11') and securing means (12) extending through the receptacle unit (11) and comprising cooperting cylindrical means (20) which are urged apart by spring means (40) and provided on their outboard ends with friction means (50) which operatively and releasably engage the device (10) with the window frame (110).

11 Claims, 1 Drawing Sheet

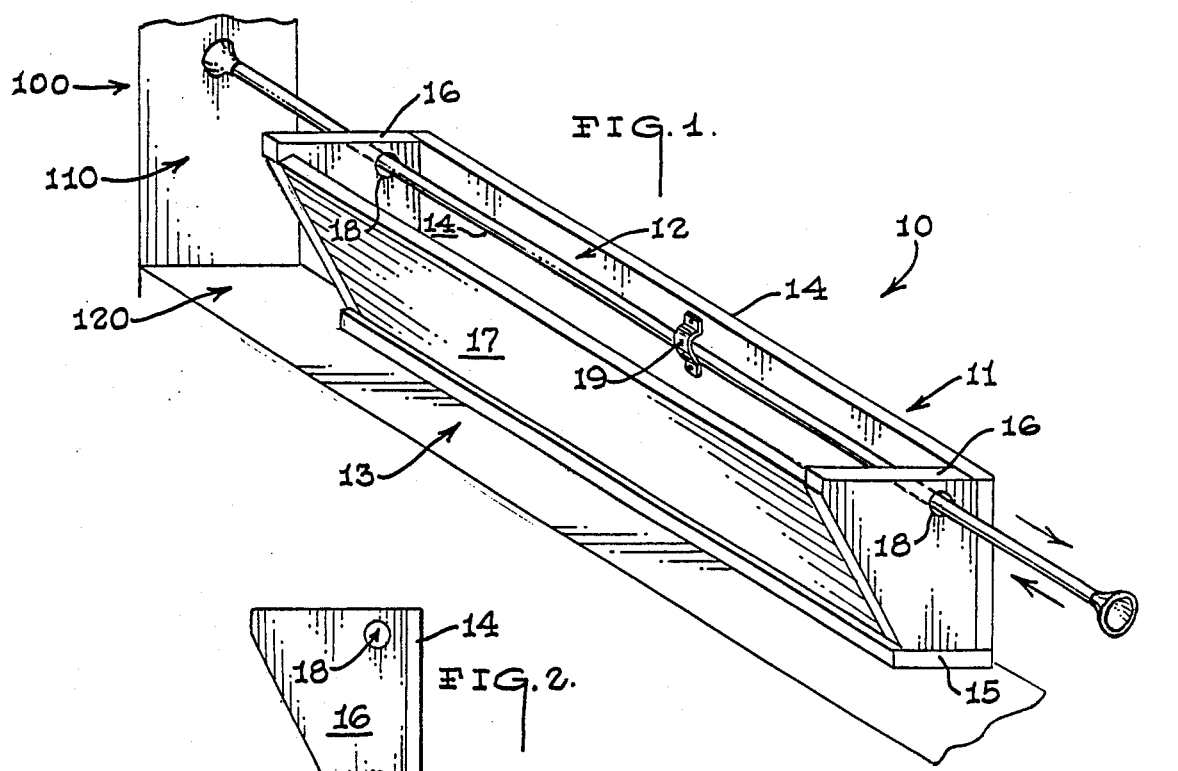
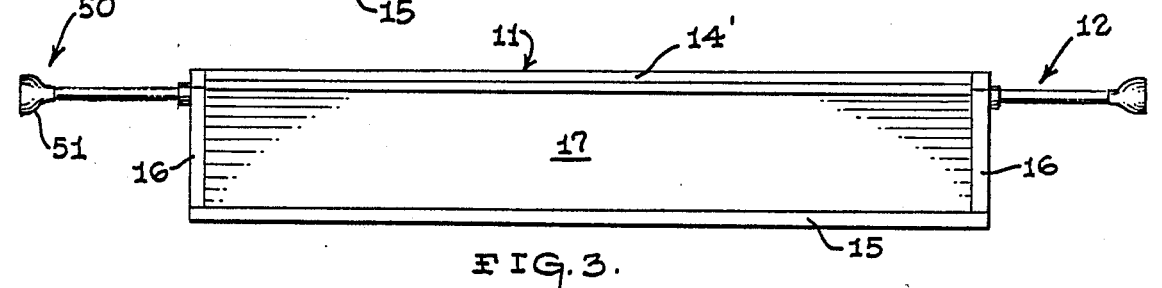

INDOOR WINDOW BOX PLANTER

TECHNICAL FIELD

The present invention relates generally to planter box constructions, and more specifically to planter boxes which are to be operatively associated with a window sill or frame.

BACKGROUND OF THE INVENTION

This invention was the subject matter of DDP Registration No. 155,883 filed in the U.S. Patent and Trademark Office on Sept. 15, 1986.

Given humankinds long standing affection for flowers, it should not be surprising to learn that the patent literature is replete with myriad and diverse window flower box constructions. Examples of some representative prior art devices may be seen by reference to the following U.S. Pat. Nos. 3,269,551; 4,048,754; 1,690,910; and, 2,223,074.

Unfortunately the majority of the prior art window box constructions have a propensity towards requiring the installation of permanent hardware on the window sill or window frame; whereby the window box may be operatively attached and detached from the permanent hardware depending on the prevailing weather conditions.

While the majority of prior art constructions are specifically designed for outside use, it would not be inconceivable that these structures could be adapted for indoor use as well; however, such a usage would require that the permanent hardware mentioned hardware to accomplish the mounting of the window box to a portion of the window assembly; the securing means themselves require a specialized construction of the window assembly in order to effect an operative connection.

A case in point of the aforementioned problem is clearly illustrated in the Martin patent; wherein, this particular device requires a pronounced lip or sill overhang on at least one side of the window assembly to provide a securing surface for the securing means; and, wherein, the lip or sill would have to extend outwardly on both sides of the window assembly to accommodate both indoor and outdoor deployment of the window box.

Obviously there has existed a long felt need for a window box construction: that did not require additional permanently installed hardware; that contained a simple integrated securing means; and, that also did not require a specific window assembly construction upon which to form an operative connection for the window box construction.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying draqwings; wherein:

FIG. 1 is a perspective view of the window box construction of this invention;

FIG. 2 is a side plan view of the window box planter;

FIG. 3 is a front elevation view of the window box planter;

FIG. 4 is a top plan view of the window box planter;

FIG. 5 is an isolated view of the preferred securing means for the window box planter; and, FIGS. 6 thru 9 are enlarged detail views of alternate embodiments of the securing means.

BEST MODE FOR CARRYING OUT THE INVENTION

As can be seen by reference to the drawings and in particular to FIG. 1, the window box planter device that forms the basis of the present invention is designated generally by the reference numeral (10). The window box device (10) comprises in general a receptacle unit (11) and securing means (12). These structural components will now be described in seriatim fashion.

Prior to embarking on a description of the window box planter device (10) it should be appreciated by reference to FIG. 1, that this invention was specifically designed for use in combination with a standard window assembly (100) comprising a generally rectangular window frame (110), and a generally horizontal window sill (120).

Still referring to FIG. 1, it can be seen that the receptacle member (13) having a rear wall element (14) a floor element (15) a pair of side wall elements (16) and an angled front wall element (17) connected together to form an elongated generally rectangular open topped receptacle member (13).

As can best be seen by reference to FIGS. 1, 2, and 4, the vertical side wall elements (16) of the receptacle member (13) are provided with aligned apertures (18) which are dimensioned to slideably receive the securing means (12) for operatively securing the window box construction (10) within a standard window assembly (100). In addition, the interior face (14') of the rear wall element (14) is provided with a clamp element (19) which supports the securing means (12) within the receptacle member (13).

The securing means (12) of this invention comprises in general cooperating cylindrical means (20) which are urged apart by spring means (40). In the preferred embodiment illustrated in FIG. 5, the cooperating cylindrical means (20) comprises an elongated hollow cylindrical member (21) having a spring member (41) disposed in the interior of the hollow cylindrical member (21); and having a pair of solid cylindrical rod members (22) slideably disposed in the ends of the hollow cylindrical member (21) and operatively associated with the spring member (41). In addition, the outboard ends of the solid cylindrical rod members (22) are provided with friction means (50) in the form of suction cup members (51) for releasably securing the window box construction (10) within a window assembly (100).

In the first alternate embodiment of the invention illustrated in FIG. 6, the cylindrical means (20) comprises an intermediate solid cylindrical member (23) slideably engaged on opposite ends by hollow cylindrical members (24) having closed outboard ends (25). In this embodiment the spring means (40) comprise a pair of spring elements (42,43) disposed between the ends of the intermediate solid cylindrical member (23) and the closed outboard ends (25) of the hollow cylindrical members (24).

In the second alternate embodiment of the invention illustrated in FIG. 7, the cylindrical means (20) comprises an intermediate hollow cylindrical member (26) slideably receiving a pair of hollow cylindrical members (27) having closed outboard ends (28). In this embodiment the spring means (40) comprises a single elongated spring element (44) whose opposite ends operatively engage the closed outboard ends (28) of the hollow cylindrical members (27).

In the third alternate embodiment of the invention illustrated in FIG. 8, the cylindrical means (20) comprises a pair of elongated hollow cylindrical members (29) slideably disposed with respect to one another and having closed outboard ends (30). In this embodiment, the spring means (40) comprises a single elongated spring element (45) disposed within both hollow cylindrical members (29) and operatively engated with the closed outboard ends (30) of the hollow cylindrical members (29).

In the fourth alternate embodiment of the invention illustrated in FIG. 9, the cylindrical means (20) comprises a solid intermediate cylindrical member (31) having recesses (32) formed on its opposite ends; wherein, a pair of solid cylindrical rod elements (33, 34) are slideably disposed in the end recesses (32) of the intermediate solid cylindrical member (31). In this embodiment, the spring means (40) comprise a pair of spring elements (46,47) disposed in the recesses (32) of the solid intermediate cylindrical member (31) and opeartively engaged with the inboard ends of the solid cylindrical rod elements (33,34).

In all of the aforementioned embodiments the spring means (40) bias the cylindrical means (20) outwardly; whereby the friction means (50) on the outboard ends of the securing means (12) operatively engage the window frame (110) of the window assembly (100) to maintain the window box receptacle unit (11) in place relative to the interior or exterior window sill (120) upon which the receptacle unit (11) rests.

It should be appreciated by now that a window box planter device (10) built in accordance with the above teachings, requires neither auxiliary permanently installed hardware, nor specialized window assembly construction to accommodate the deployment of the window box planter device; and, this device can be readily installed on either the indoor or outdoor portions of the window assembly.

Having thereby described the subject matter of this invention it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A window box planter device combination with a window assembly including a window frame and window sill; wherein, the device consists of:
   a receptacle unit comprising a floor element, a rear wall element, a front wall element and a pair of side wall members wherein the side wall members are provided with a pair of axially aligned apertures;
   a cylindrical means comprising at least two elongated cylindrical members relatively movable with respect to one another and operatively associated with said apertures for frictionally securing said device within said window frame;
   frictional means associated with outboard ends of said at least two elongated cylindrical members;
   spring biasing means operatively associated with said relatively movable cylindrical members; and,
   a clamp element disposed on the rear wall element of said receptacle unit wherein the clamp element is aligned with the apertures in the side wall members and the clamp element and the apertures are dimensioned to receive the relatively movable cylindrical members; and, wherein the relatively movable cylindrical members comprise: a first cylindrical member containing said spring means; and, a second cylindrical member operatively connected to said spring biasing means for biasing said first cylindrical member and said second cylindrical member away from one another whereby the window box planter device may be positioned relative to said window assembly such that the floor element of the receptacle unit will rest on the window sill while the cylindrical means will engage opposite sides of the window frame to limit the movement of the receptacle unit relative to the window sill assembly.

2. A device as in claim 1; wherein, said first cylindrical member comprises a first rod element having a closed outboard end and an open inboard end;
   said second cylindrical member comprises a second rod element having a closed outboard end and whose inboard end is insertable into said inboard end of said first rod element.

3. A device as in claim 2; wherein, said spring biasing means comprises a spring member which is disposed within said first rod element and in operatively associated with said inboard end of said second rod element.

4. A device as in claim 2; wherein, said spring biasing means comprises an elongated spring member which is operatively associated with the inner portion of said outboard ends of said first and said second rod element.

5. A device as in claim 1; wherein,
   said first cylindrical member comprises an open ended hollow cylinder element;
   said second cylindrical member comprises a pair of rod elements each having a solid outboard end and inboard ends which are insertable into said open ended hollow cylinder.

6. A device as in claim 5; wherein, said spring biasing means comprises a spring element operatively associated with the inboard ends of said pair of rod elements.

7. A device as in claim 5; wherein, said spring biasing means comprises a pair of spring elements.

8. A device as in claim 7; wherein, said pair of spring elements have ends operatively associated with an intermediate cylindrical member.

9. A device as in claim 1; wherein,
   said first cylindrical member comprises an intermediate solid cylindrical member provided with a recess in each end;
   said second cylindrical member comprises a pair of rod elements each having a solid outboard end and an inboard end which are operatively associated with said spring biasing means.

10. A device as in claim 9; wherein, said spring biasing means comprise a pair of spring members disposed within said recesses.

11. A device as in claim 1; wherein, said frictional means comprises a pair of suction cups disposed on the outboard ends of said cylindrical means.

* * * * *